(12) United States Patent
Mullen et al.

(10) Patent No.: US 7,735,905 B2
(45) Date of Patent: Jun. 15, 2010

(54) AUTOMOTIVE VEHICLE INSTRUMENT PANEL SYSTEM

(75) Inventors: Gary D. Mullen, Farmington, MI (US); Michael Alan Samluk, New Hudson, MI (US); Michael Williams, Northville, MI (US); Brian Charles Slane, Flat Rock, MI (US); Kalyanaraman Bharathan, Canton, MI (US); Andrew James Harley, Novi, MI (US); James Daniel Grace, Dearborn Heights, MI (US); Peter Joseph Bejin, Northville, MI (US)

(73) Assignees: Ford Global Technologies, LLC, Dearborn, MI (US); Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 11/832,250

(22) Filed: Aug. 1, 2007

(65) Prior Publication Data
US 2009/0033126 A1 Feb. 5, 2009

(51) Int. Cl.
*B62D 25/14* (2006.01)
(52) U.S. Cl. .................. 296/193.02; 296/70
(58) Field of Classification Search .................. 296/70, 296/193.2
See application file for complete search history.

(56) References Cited

U.S. PATENT DOCUMENTS

| | | | |
|---|---|---|---|
| 4,562,025 A | 12/1985 | Gray | |
| 4,925,151 A | 5/1990 | Gray | |
| 5,304,273 A | 4/1994 | Kenrick et al. | |
| 5,364,159 A * | 11/1994 | Kelman et al. | 296/192 |
| 5,556,153 A * | 9/1996 | Kelman et al. | 296/70 |
| 5,709,601 A * | 1/1998 | Heck | 454/121 |
| 5,823,602 A * | 10/1998 | Kelman et al. | 296/70 |
| 6,110,037 A * | 8/2000 | Yoshinaka | 454/143 |
| 6,203,092 B1 * | 3/2001 | Yoshinaka | 296/70 |
| 6,250,678 B1 | 6/2001 | Yoshinaka et al. | |
| 6,354,623 B1 * | 3/2002 | Delmastro | 280/732 |
| 6,601,902 B1 * | 8/2003 | Rahmstorf et al. | 296/70 |
| 6,802,559 B2 | 10/2004 | Yoshihara et al. | |
| 2005/0076594 A1 | 4/2005 | Warner | |
| 2006/0040605 A1 | 2/2006 | Lee | |
| 2006/0108824 A1 * | 5/2006 | Yamazaki et al. | 296/70 |
| 2006/0175858 A1 * | 8/2006 | Pegorier et al. | 296/70 |
| 2006/0226574 A1 | 10/2006 | Bozio et al. | |

FOREIGN PATENT DOCUMENTS

| | | |
|---|---|---|
| EP | 1 334 864 B1 | 9/2006 |
| EP | 1 712 429 A2 | 10/2006 |
| JP | 2002067054 | 3/2002 |
| WO | 02/12030 A1 | 2/2002 |
| WO | WO 03/058005 A2 | 7/2003 |
| WO | 2004/052675 A1 | 6/2004 |
| WO | WO 2006/076129 A1 | 7/2006 |

* cited by examiner

*Primary Examiner*—Dennis H Pedder
(74) *Attorney, Agent, or Firm*—Gregory Brown; Brooks Kushman P.C.

(57) ABSTRACT

An instrument panel system includes box sections that increase the stiffness, rigidity, and natural frequency of the instrument panel system. A two-piece instrument panel system provides a two-tone appearance with differing die draws and grains.

18 Claims, 6 Drawing Sheets

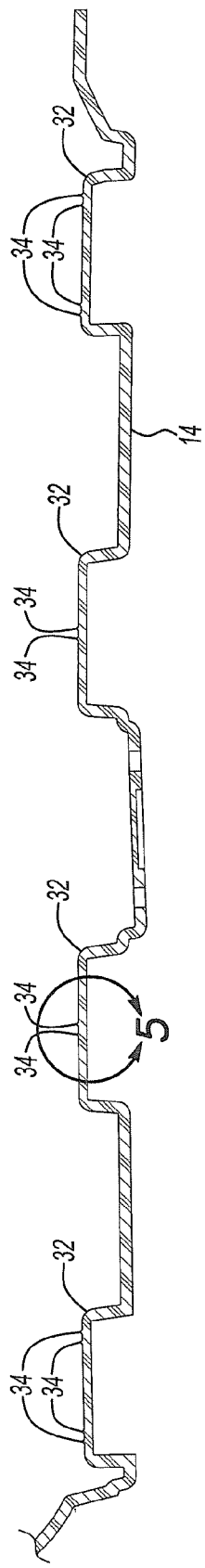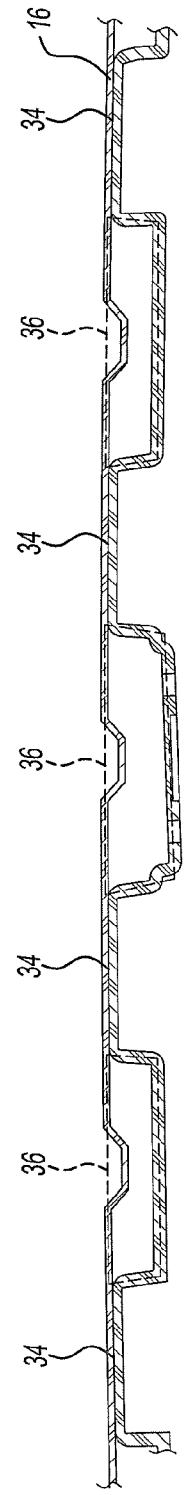

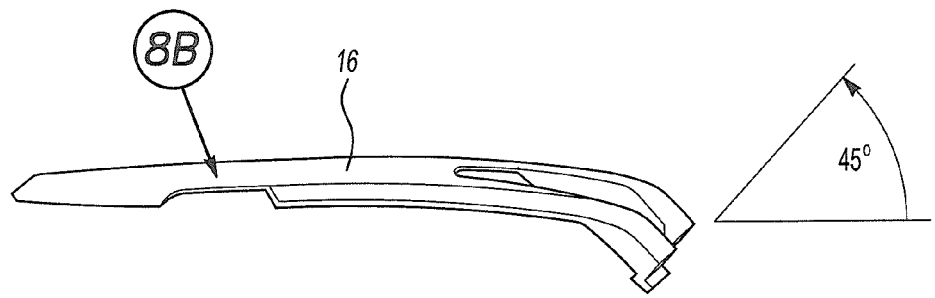
Fig-8A
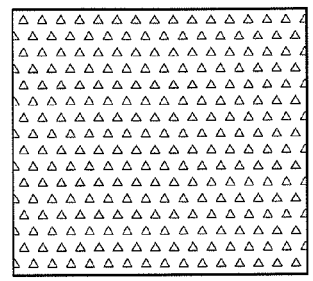
Fig-8B
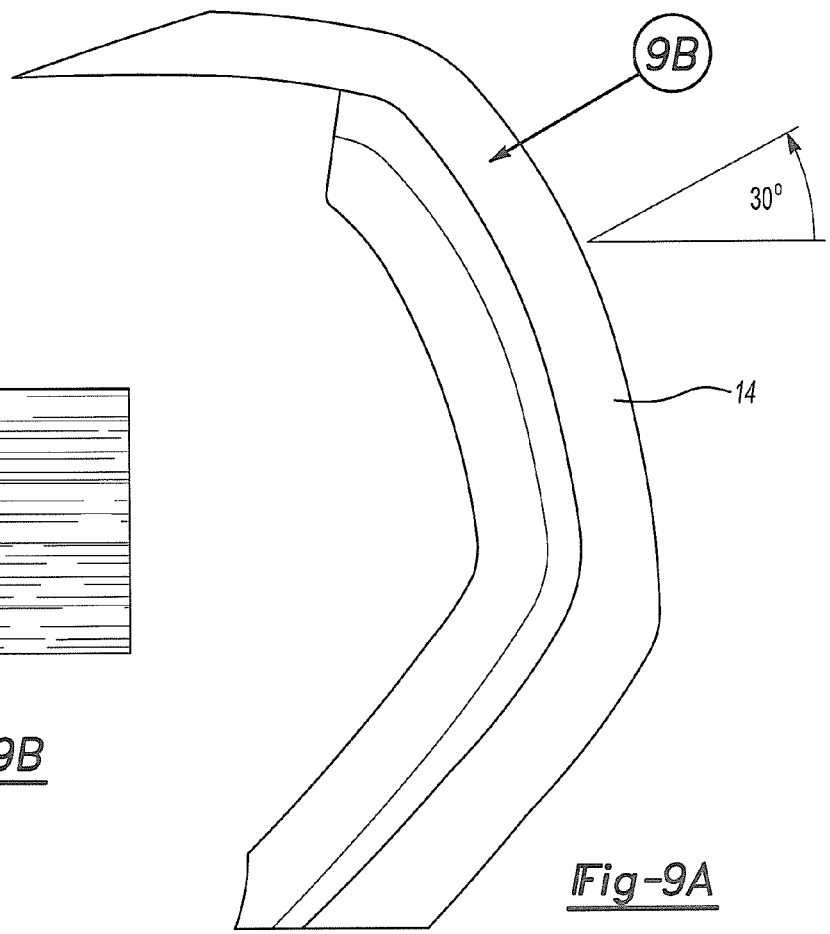
Fig-9A
Fig-9B

AUTOMOTIVE VEHICLE INSTRUMENT PANEL SYSTEM

BACKGROUND OF THE INVENTION

1. Field of the Invention

The invention relates to automotive vehicle instrument panel systems.

2. Discussion

Two-tone instrument panels may require painting, special tooling, e.g., dual-shot, and/or finish panels.

Instrument panels may be attached at the upper cowl area to stabilize the instrument panel under vehicle vibration modes.

SUMMARY

Embodiments of the invention may take the form of an instrument panel system for a vehicle. The system includes an upper substrate and a lower substrate including a portion configured to be covered by the upper substrate. The portion configured to be covered by the upper substrate includes a plurality of castlations. Portions of two adjacent castlations and a portion of the upper substrate form a closed structural section.

Embodiments of the invention may take the form of an instrument panel system for a vehicle. The system includes a substrate including a corrugated portion having a plurality of corrugations. The system also includes a topper configured to cover the corrugated portion of the substrate. Portions of two adjacent corrugations and a portion of the topper form a closed structural member.

Embodiments of the invention may take the form of an instrument panel system for a vehicle including a body structure. The system includes a cross car beam assembly mechanically attached with the body structure, a defroster air duct mechanically attached with the cross car beam assembly, and a substrate assembly mechanically attached with the cross car beam assembly and fixed to the defroster air duct. The cross car beam assembly, defroster air duct, and substrate assembly form a closed structural member.

While exemplary embodiments in accordance with the invention are illustrated and disclosed, such disclosure should not be construed to limit the claims. It is anticipated that various modifications and alternative designs may be made without departing from the scope of the invention.

BRIEF DESCRIPTION OF THE DRAWINGS

FIG. 4 is a front view, in cross-section, of the instrument panel of FIG. 2 taken along section line 4-4 of FIG. 2 and shows undulations in a portion of the instrument panel.

FIG. 5 is an enlarged view of a portion of a top of an undulation of FIG. 4 and shows weld mounts in detail.

FIG. 6 is a front view, in cross-section, of a portion of the instrument panel system of FIG. 1 taken along section line 6-6 of FIG. 1 and shows the undulations in a portion of the instrument panel and the cover forming structural boxes.

FIG. 8a is a side schematic view of the cover of FIG. 2 and shows the die draw of the cover.

FIG. 8b is schematic view of a portion of the surface of the cover of FIG. 2 and shows the grain of the surface of the cover of FIG. 2.

FIG. 9a is a side schematic view of the instrument panel of FIG. 2 and shows the die draw of the instrument panel.

FIG. 9b is a schematic view of a portion of the surface of the instrument panel of FIG. 2 and shows the grain of the surface of the instrument panel of FIG. 2.

DETAILED DESCRIPTION

Embodiments of the invention may provide a two-piece instrument panel welded together. A forward edge of the instrument panel may be supported by a duct. The duct may be supported by a cross car beam or other structural subsystem.

Embodiments of the invention may provide a two-tone instrument panel, allow a clam-shell design, which may increase the stiffness and thus natural frequency of the instrument panel, allow differing die draws on the top and rearward surfaces of the instrument panel, which may eliminate parting lines on any Class A surfaces, eliminate the need for cowl top attachments, which may eliminate small finish panels to cover any fasteners, and reduce squeak and rattle.

Figure 1:
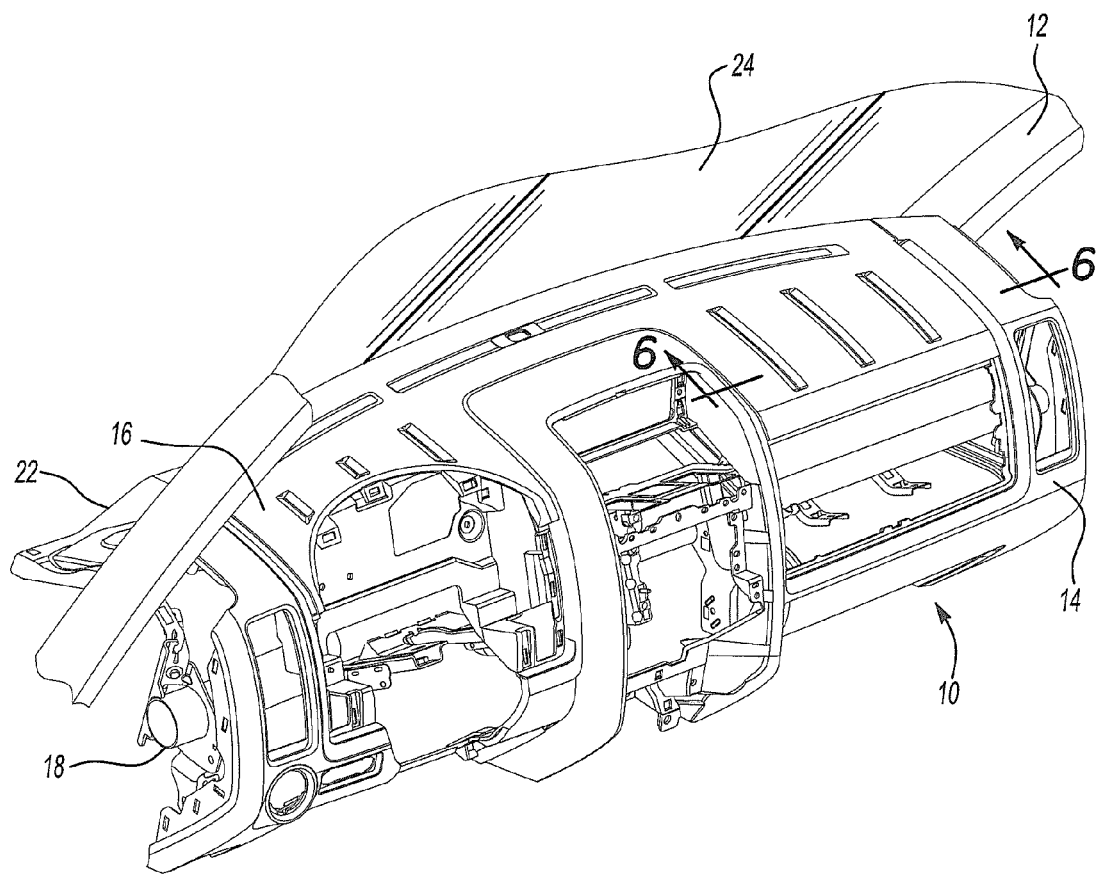
FIG. 1 is an isometric view of an instrument panel system in accordance with an embodiment of the invention.

FIG. 1 is an isometric view of an instrument panel system. As explained below, instrument panel system 10 of vehicle 12 has structural properties that increase, for example, its stiffness, rigidity, and natural frequency, e.g., 36.5 Hz, such that instrument panel system 10 is capable of resisting, for example, deflection, torsion, and vibration. Additionally, the two-piece construction of instrument panel system 10 permits, for example, differing die draws between the pieces of the instrument panel and two-tone coloring.

Figure 2:
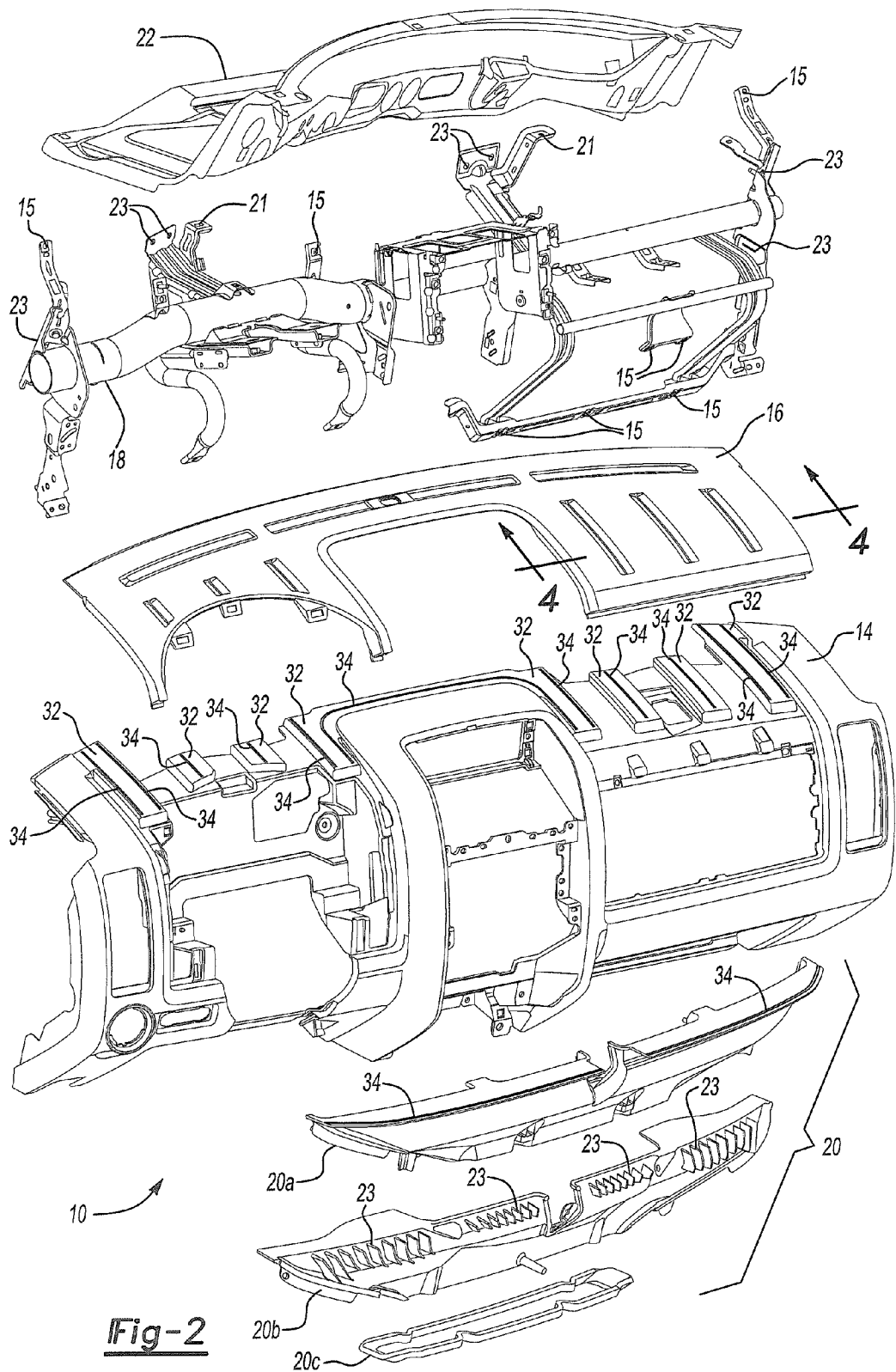
FIG. 2 is an exploded isometric view of the instrument panel system of FIG. 1 and shows the instrument panel, cover, beam assembly, and defroster nozzle assembly.
Figure 3:
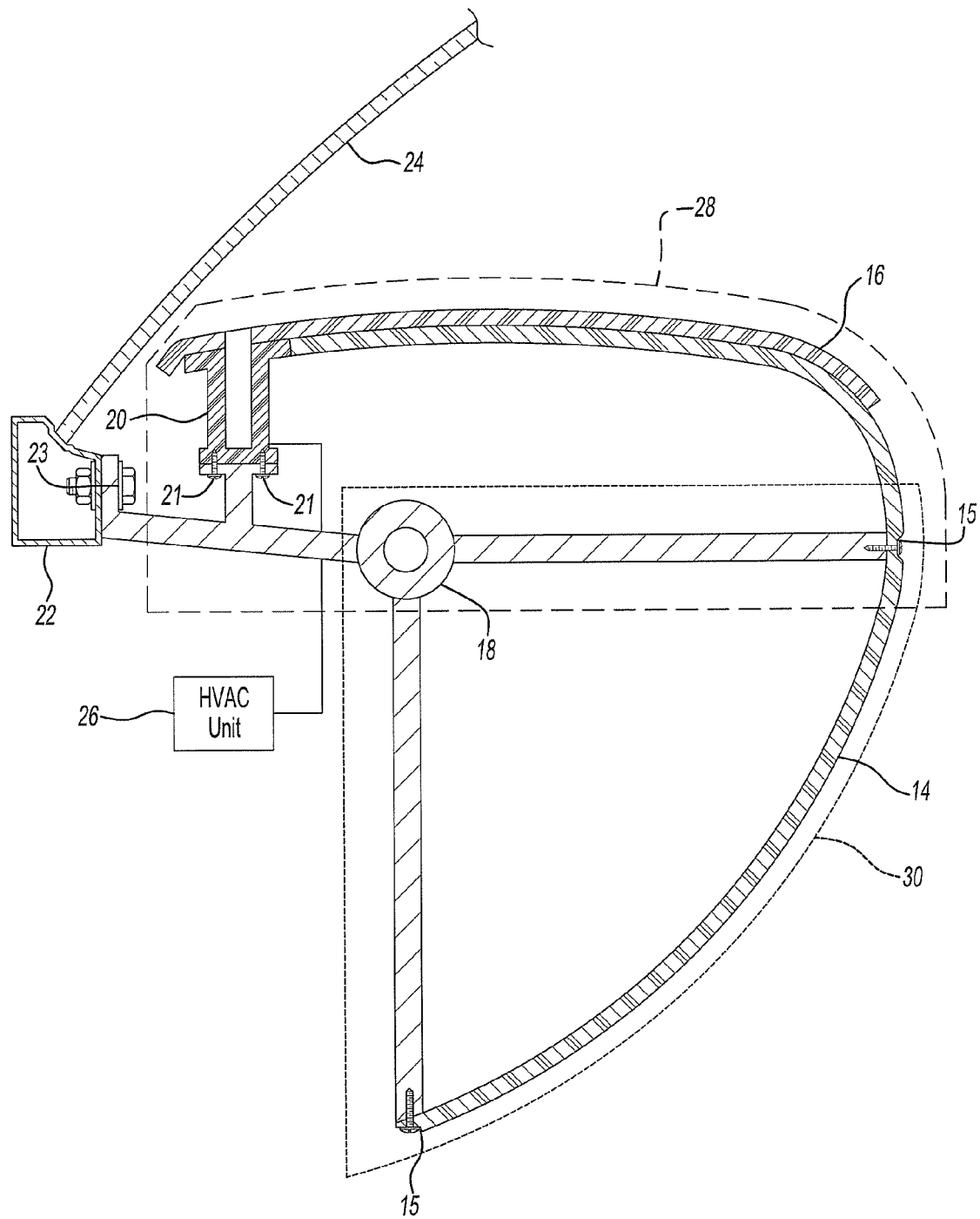
FIG. 3 is a side schematic view, in cross-section, of the instrument panel system of FIG. 1 and shows the structural box formed by portions of the beam assembly, defroster nozzle, and instrument panel.

FIG. 2 is an exploded isometric view of the instrument panel system of FIG. 1. Instrument panel system 10 includes instrument panel 14 (lower substrate), cover 16 (upper substrate or topper), beam assembly 18, and defroster nozzle assembly 20. Instrument panel 14 and cover 16 are each one-piece, molded in color, Thermal Plastic Olefin (TPO) injection moldings. Beam assembly 18 is a multi-piece stamping, AISI 1008 1010 cold rolled steel, MIG welded together. Beam assembly 18 supports instrument panel 14 and cover 16 and mounts with cowl 22. Defroster nozzle assembly includes upper section 20a, middle section 20b, and lower section 20c. Upper and middle sections 20a, 20b are polypropylene injection moldings that are welded, e.g., heat staked, together. Lower section 20c is a self adhered polyester foam that seals with heating, ventilation, air conditioning (HVAC) unit 26 (FIG. 3). Middle section 20b includes baffles 23 to direct air from HVAC unit 26 (FIG. 3) to windshield 24 (FIG. 3.) Defroster nozzle assembly 20 screws to beam assembly 18 and is welded to cover 16 at welding ribs 34. Cowl 22 is a one-piece stamping, AISI 1008 1010 cold rolled steel. Cowl 22 provides support for beam assembly 18 and is part of the body structure of vehicle 12. In alternative embodiments, instrument panel 14, cover 16, beam assembly 18, and defroster nozzle assembly 20 may be manufactured and assembled in any suitable fashion.

FIG. 3 is a side schematic view, in cross-section, of the instrument panel system of FIG. 1. As explained below, instrument panel 14 is attached, e.g., ultrasonically bonded, vibration welded, heat staked, chemically adhered, with cover 16. Beam assembly 18 is mechanically attached, e.g., screwed, bolted, with instrument panel 14 and cowl 22 at points 15, 23 respectively. Defroster nozzle assembly 20 is fixed, e.g., screwed, bonded, with cover 16 and mechanically attached, e.g., screwed, with beam assembly 18 at points 21. Windshield 24 rests within cowl 22.

Structural box section 28 is formed by portions of instrument panel 14, beam assembly 18, and defroster nozzle assembly 20. Structural box section 28 increases the stiffness, rigidity, and natural frequency of instrument panel system 10 such that it resists deformation, torsion, and vibration. Structural box section 30 is formed by portions of instrument panel 14 and beam assembly 18. Structural box section 30, like structural box section 28, increases the stiffness, rigidity, and natural frequency of instrument panel system 10 such that it resists deformation, torsion, and vibration.

FIG. 4 is a front view, in cross-section, of a corrugated portion of the instrument panel of FIG. 2 taken along section line 4-4 of FIG. 2. Undulations 32 (corrugations) are formed across portions of instrument panel 14. Mounts 34 provide material that upon, for example, ultrasonic welding with cover 16, bond with cover 16.

FIG. 5 is an enlarged view of a portion of a top of an undulation of FIG. 4 and shows weld mounts in detail. Mounts 34 are triangular in shape. In alternative embodiments, mounts 34 may take any desired form.

FIG. 6 is a front view, in cross-section, of a portion of the instrument panel system of FIG. 1 taken along section line 6-6 of FIG. 1. Cover 16 is bonded, e.g., ultrasonically bonded, vibration welded, heat staked, chemically adhered, etc., with the tops of undulations 32 via mounts 34. Structural box sections 36 are formed by undulations 34 and portions of cover 16. Structural box sections 36, like structural box sections 28, 30, increase the stiffness, rigidity, and natural frequency of instrument panel system 10 such that it resists deformation, torsion, and vibration.

Figure 7:
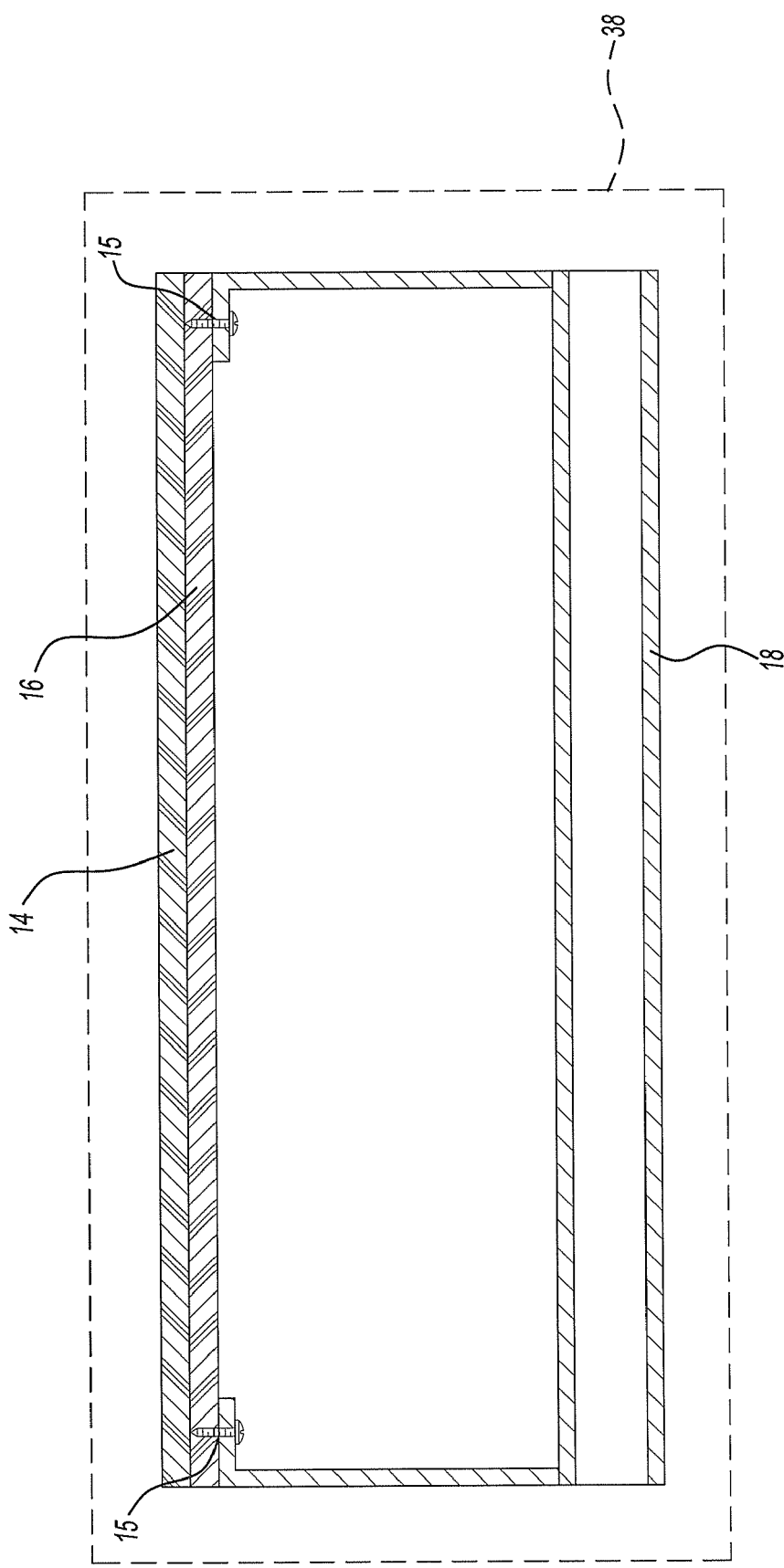
FIG. 7 is a front schematic view, in cross-section, of a portion of the instrument panel system of FIG. 1 and shows the instrument panel and beam assembly forming a structural box.

FIG. 7 is a front schematic view, in cross-section, of a portion of the instrument panel system of FIG. 1. Instrument panel 14 is mechanically connected, e.g., bolted, screwed, with beam assembly 18. Structural box section 38 is formed by instrument panel 14 and beam assembly 18. Structural box section 38, like structural box sections 28, 30, 36, increase the stiffness, rigidity, and natural frequency of instrument panel system 10 such that it resists deformation, torsion, and vibration.

FIG. 8a is a side schematic view of the cover of FIG. 2. The die draw of cover 16 is shown.

FIG. 8b is schematic view of a portion of the surface of the cover of FIG. 2. The grain of cover 16 is shown.

FIG. 9a is a side schematic view of the instrument panel of FIG. 2. The die draw of instrument panel 14 is shown. The die draw of instrument panel 14 is different than the die draw of cover 16.

FIG. 9b is a schematic view of a portion of the surface of the instrument panel of FIG. 2. The grain of instrument panel 14 is shown. The grain of instrument panel 14 is different than the grain of cover 16.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A vehicle instrument panel system comprising:
an upper substrate;
a lower substrate having a rear edge portion and a portion configured to be covered by the upper substrate, wherein the portion configured to be covered by the upper substrate includes a plurality of forwardly located corrugations and wherein portions of two adjacent corrugations and a portion of the upper substrate form a closed structural section; and
a cross car beam assembly configured to support the lower substrate and attached with the lower substrate in a vicinity of the rear edge portion of the lower substrate such that the lower substrate and cross car beam assembly form a closed structural member.

2. The system of claim 1 wherein the upper substrate has a first color and wherein the lower substrate has a second color different than the first color.

3. The system of claim 1 wherein the upper substrate has a first die draw and the lower substrate has a second die draw different than the first die draw.

4. The system of claim 1 wherein the upper substrate has a first grain and the lower substrate has a second grain different than the first grain.

5. The system of claim 1 wherein each of the plurality of corrugations has a top and wherein the upper substrate is bonded with each of the tops.

6. The system of claim 5 wherein the upper substrate is ultrasonically bonded with each of the tops.

7. The system of claim 5 wherein the upper substrate is vibration welded with each of the tops.

8. The system of claim 5 wherein the upper substrate is heat staked with each of the tops.

9. The system of claim 5 wherein the upper substrate is chemically adhered with each of the tops.

10. A vehicle instrument panel system comprising:
a substrate having a rear edge portion and a corrugated portion having a plurality of forwardly located corrugations;
a topper configured to cover the corrugated portion, portions of two adjacent corrugations and a portion of the topper forming a closed structural member; and
a cross car beam assembly attached with the rear edge portion such that the substrate and cross car beam assembly form a closed structural member.

11. The system of claim 10 wherein the substrate has a first color and wherein the topper has a second color different than the first color.

12. The system of claim 10 wherein the substrate has a first die draw and the topper has a second die draw different than the first die draw.

13. The system of claim 10 wherein the substrate has a first grain and the topper has a second grain different than the first grain.

14. The system of claim 10 wherein each of the plurality of corrugations has a top and wherein the topper is bonded with each of the tops.

15. An instrument panel system for a vehicle including a body structure for supporting the instrument panel system, a climate control unit, and a windshield, the system comprising:
a cross car beam assembly for supporting a substrate assembly mechanically attached with the body structure;
a defroster air duct mechanically attached with the cross car beam assembly for guiding air from the climate control unit to the windshield; and a substrate assembly mechanically attached with the cross car beam assembly and fixed to the defroster air duct wherein the cross car beam assembly, defroster air duct, and substrate assembly form a closed structural member.

16. The system of claim 15 wherein the cross car beam is bolted with the body structure.

17. The system of claim 15 wherein the cross car beam is screwed with the body structure.

18. The system of claim 15 wherein the cross car beam assembly and substrate assembly form a closed structural member.

* * * * *